United States Patent
Kapadia et al.

(10) Patent No.: US 7,798,563 B2
(45) Date of Patent: Sep. 21, 2010

(54) LOCATOR ASSEMBLY

(75) Inventors: Ameil A. Kapadia, Shelby, MI (US); Gari M. Schalte, Oakland Township, MI (US); Thomas Pilette, Lake Orion, MI (US)

(73) Assignee: Magna International, Inc., Aurora (CA)

( * ) Notice: Subject to any disclaimer, the term of this patent is extended or adjusted under 35 U.S.C. 154(b) by 72 days.

(21) Appl. No.: 12/228,927

(22) Filed: Aug. 18, 2008

(65) Prior Publication Data
US 2008/0307629 A1 Dec. 18, 2008

Related U.S. Application Data

(63) Continuation of application No. 11/700,424, filed on Jan. 31, 2007, now Pat. No. 7,431,384, which is a continuation of application No. PCT/US2006/038630, filed on Sep. 29, 2006.

(60) Provisional application No. 60/722,273, filed on Sep. 30, 2005.

(51) Int. Cl.
*B60N 99/00* (2006.01)

(52) U.S. Cl. .......................... 296/193.05; 296/193.09; 296/203.02; 296/203.03

(58) Field of Classification Search ............ 296/193.05, 296/193.09, 203.02, 203.03, 205
See application file for complete search history.

(56) References Cited

U.S. PATENT DOCUMENTS

| 6,196,624 | B1 | 3/2001 | Bierjon et al. |
| 6,270,152 | B1 | 8/2001 | Sato |
| 6,698,822 | B2 | 3/2004 | Adamski |
| 7,431,384 | B2 | 10/2008 | Kapadia et al. |
| 2005/0206200 | A1 | 9/2005 | Tazaki et al. |

FOREIGN PATENT DOCUMENTS

| EP | 1 270 387 | 1/2003 |
| EP | 1 279 587 | 1/2003 |
| EP | 1 544 035 | 6/2005 |

*Primary Examiner*—Lori L Lyjak
(74) *Attorney, Agent, or Firm*—Warn Partners, P.C.; Marc Luddy

(57) ABSTRACT

In accordance with the present invention, there is provided a locating pin and a retention clip. The locating pin and the retention clip allow alignment of the front end module with the body structure and the retention clip secures the two assemblies in place which allows alignment of fastener holes. This conserves time in the assembly line and allows more accurate and rapid assembly of the front end module on the body structure reducing the time necessary for assembly.

5 Claims, 4 Drawing Sheets

LOCATOR ASSEMBLY

CROSS-REFERENCE TO RELATED APPLICATIONS

This application is a continuation-in-part of U.S. patent application Ser. No. 11/700,424, filed Jan. 31, 2007, which is a continuation of PCT/US2006/038630 filed Sep. 29, 2006, which claims the benefit of U.S. Provisional Application No. 60/722,273 filed Sep. 30, 2005. The disclosures of the above applications are incorporated herein by reference.

TECHNICAL FIELD

The present invention relates to a locator assembly, in more particularly, to a locator assembly for temporarily aligning a front module with a body structure.

BACKGROUND OF THE INVENTION

In the automotive industry, one of the assembly steps is the necessity of attaching the front end module having various components onto a body structure. Typically, an assembly person requires a lift-assist to align the components and thereafter fasteners need to be positioned and fastened for securing the assembly of the front end module or other modules to the body structure. Because the rate of production is so high in many cases, this portion of the assembly process is more time consuming than the allotted time allowed for the operation. Therefore, there remains a need in the art to provide a better method for allowing alignment of the body structure with a front end or other module to allow ample time and more efficient fastening of the front end module to the body structure.

SUMMARY OF THE INVENTION

In accordance with the present invention, there is provided a locating pin and a retention clip. The locating pin and the retention clip allow alignment of the front end module with the body structure and the retention clip secures the two assemblies in place which allows alignment of fastener holes. This conserves time in the assembly line and allows more accurate and rapid assembly of the front end module on the body structure reducing the time necessary for assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
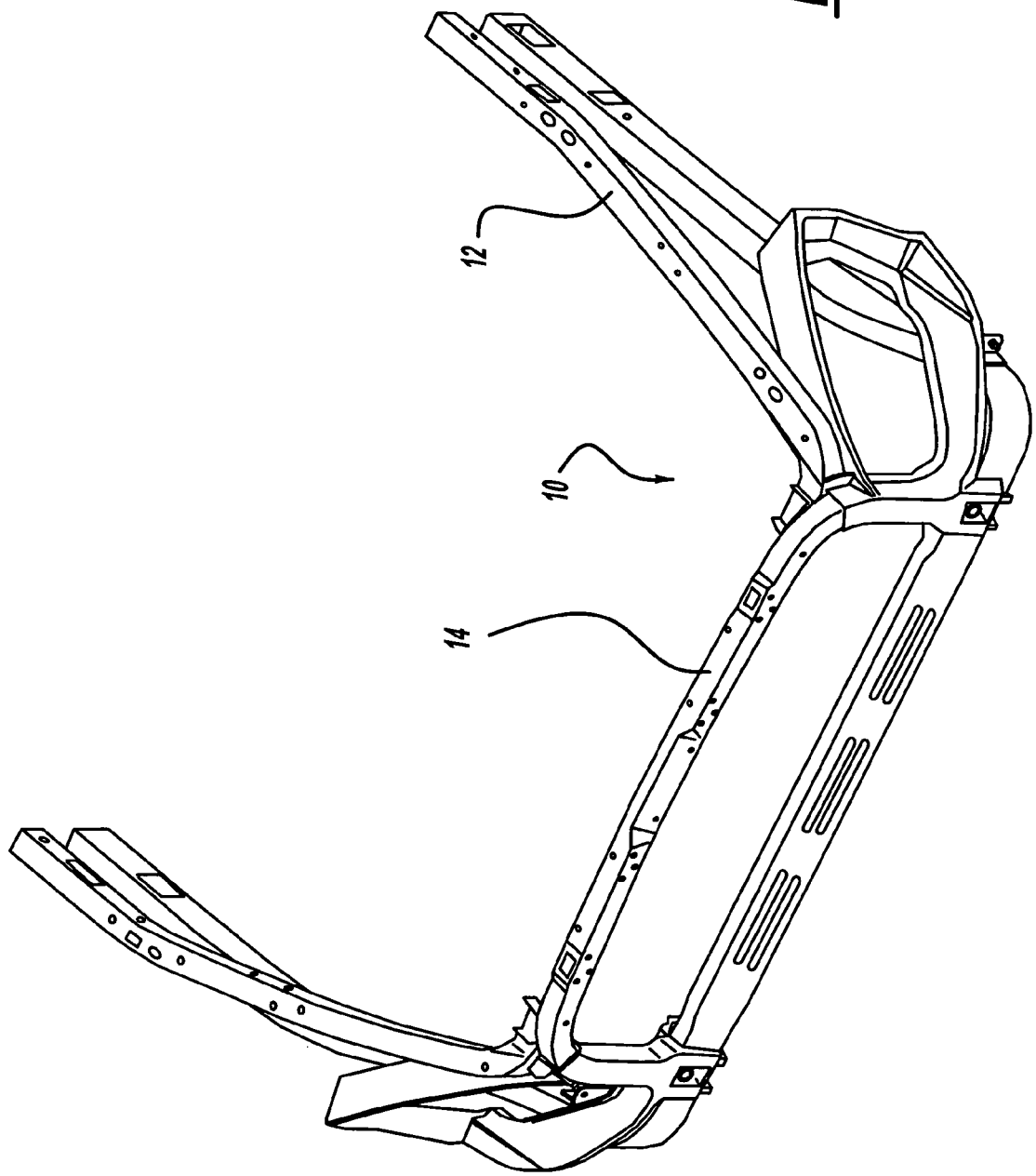
FIG. 1 is a perspective view of a front end module and body structure in which the present invention is used.
Figure 2:
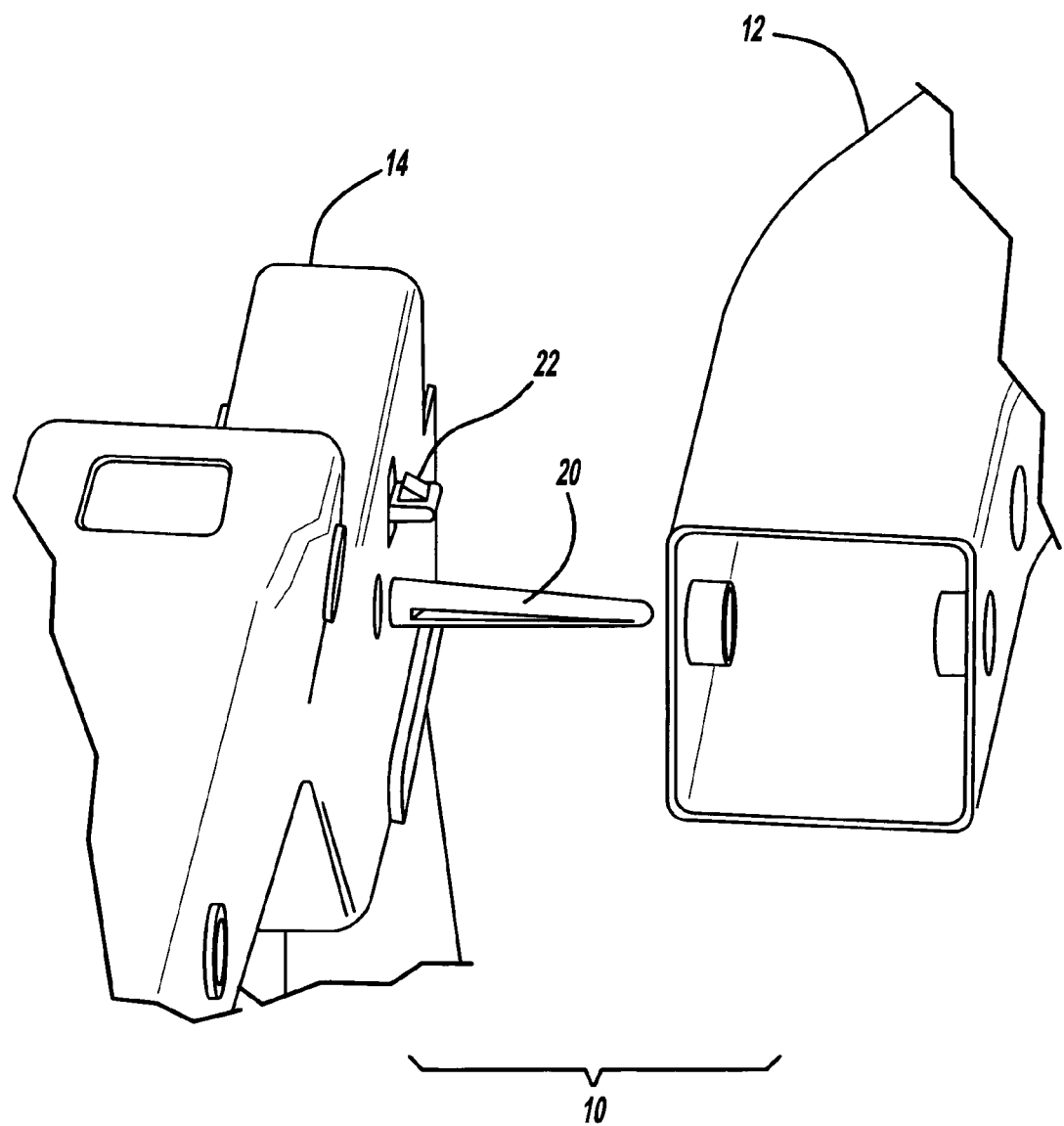
FIG. 2 is a detailed perspective view of the locator assembly of the present invention prior to location.
Figure 3:
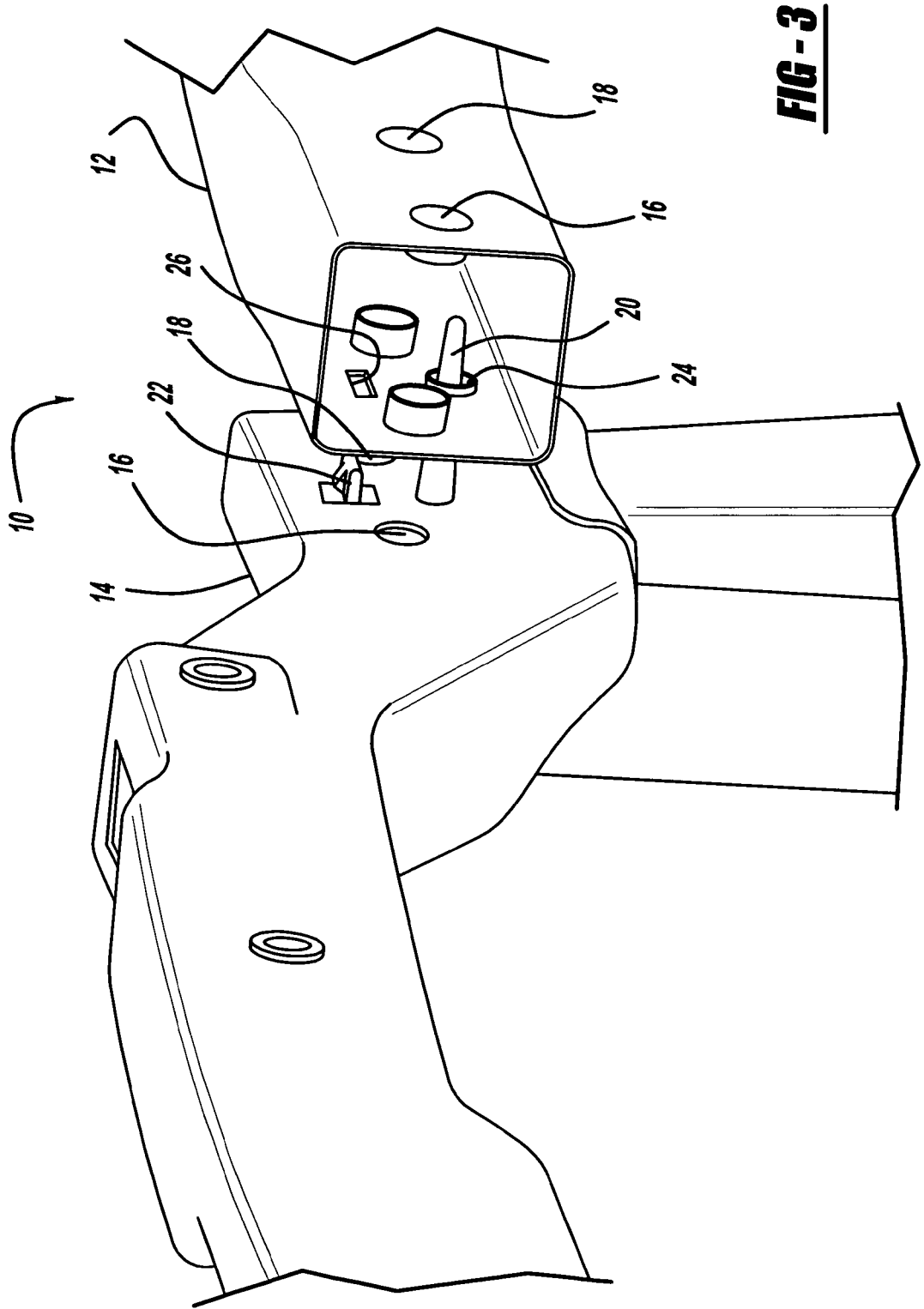
FIG. 3 is a perspective partially assembled view of the locator assembly of the present invention.

Referring now to FIGS. 1-3, a locator assembly 10 is generally shown. The locator assembly is used for locating and affixing the body structure 12 to the front end module 14. As shown in FIG. 1, front end module 14 includes various fixtures attached and is assembled in an assembly line to the body structure 12. Typically, an operator uses a lift-assist type arrangement to align a number of mounting holes 16 and 18 between the front end module and the body structure. Then the module is attached via holes as they are kept aligned until.

In the present invention, the locator assembly includes a locator pin 20 and a retention clip 22. As shown in FIG. 3, the front end module connected locator pin 20 is elongated and inserted through a location hole 24. This brings the body 12 and module 14 in alignment. As the parts are assembled toward one another, the retention clip 22 is inserted in the retention hole 26 of the structure member which secures the front end module 14 with the body structure 12 to allow enough time for efficient insertion of the fasteners into the holes 16 and 18 for fastening the assemblies together.

Figure 4:
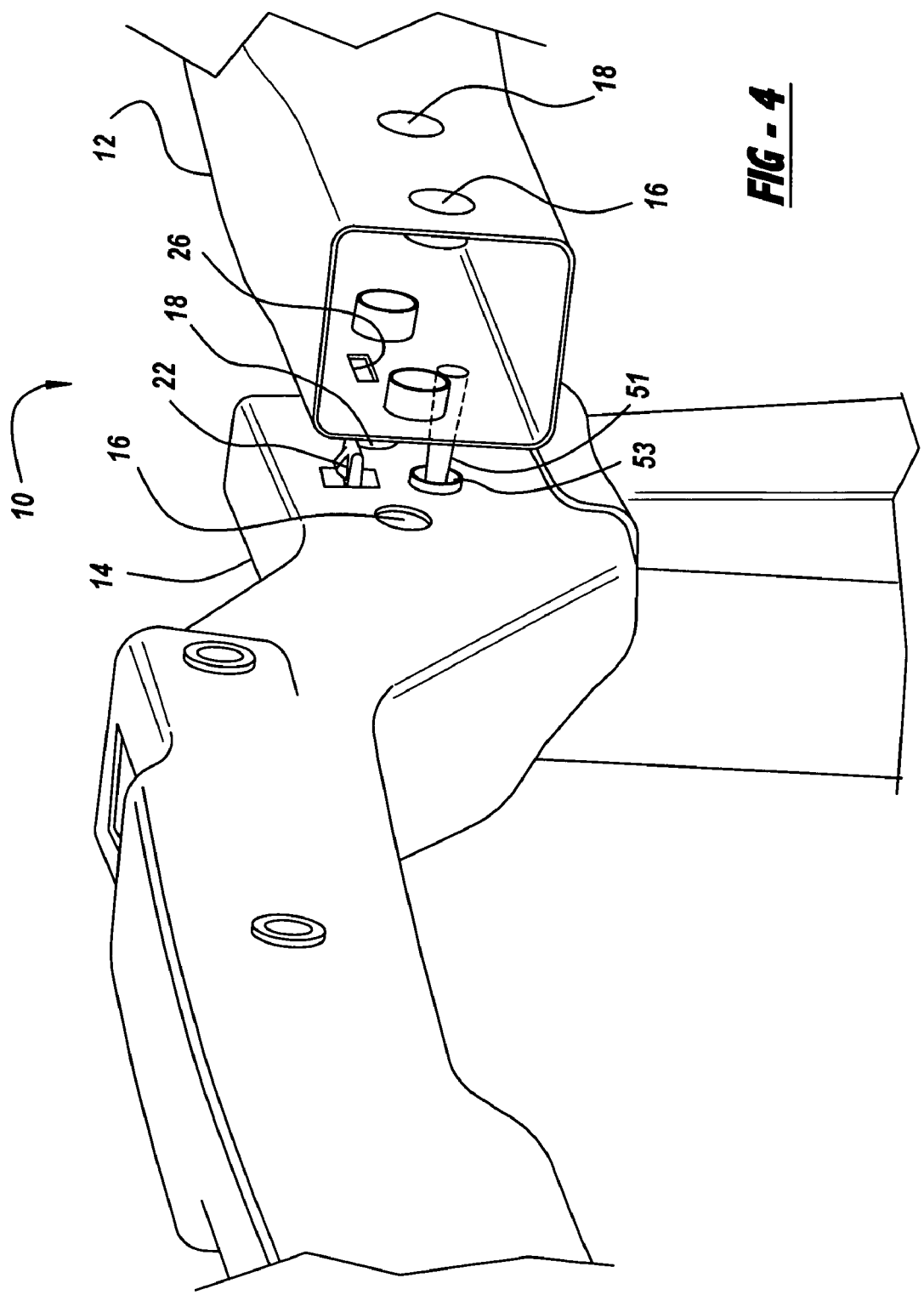
FIG. 4 is a perspective partially assembled view of another locator assembly of the present invention.

In the present case, the clip 22 and locator pin 20 are typically made of a plastic material, however, other materials which will allow retention of the assembly until fastening is complete such as metal, composite materials, or the like, can also be advantageously used in the subject invention. The assembly can be a one piece clip which is inserted through the outside of the front end module. Alternatively, these features could be integrally formed with a module overmolded into the module or placed into apertures of the front end module at the respective locations with quick attach assemblies. While the locator assembly is shown as attached to the front end module, it is also within the scope of the present invention to have these features either alone or in combination attached to the support structure as shown in FIG. 4 noted as items 51 and 53. Similarly, a clip could be attached to the support structure with the pin attached to the module or vice versa.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A locator assembly comprising:
   a front end module configured to support one or more body panels, said front end module having at least one locator hole, said front end module having one or more retaining clips extending from said front end module;
   a body structure for attachment and support of said front end module said body structure having at least one locator pin extending from said body structure for slidably engaging at least one said locator hole of said front end module during assembly; and
   one or more retention holes in said body structure for receiving said one or more retaining clips from said front end module.

2. A locator assembly comprising:
   a front end module configured to support one or more body panels of a vehicle;
   a body structure for attachment and support of said front end module;

at least one locator hole positioned on one of said front end module and said body structure for aligning said front end module during assembly;

one or more retaining clips extending from said one of said body structure and front end module; and one or more retention holes on said other of said body structure and said front end module for receiving said one or more retaining clips from said one of said body structure and front end module.

3. A locator assembly comprising:

a front end module configured to support one or more body panels;

a body structure for attachment and support of said front end module;

at least one locator pin extending from one of said front end module and said body structure for aligning said front end module during assembly;

at least one locator hole in said other one of said front end module and said body structure for sliding engagement with said locator pin; and one or more retention holes in one of said front end module and said body structure for receiving one or more retaining clips is said other one of said front end module and said body structure.

4. A locator assembly as described in claim 3 wherein both of said front end module and said body structure have at least one extending locator pin and locator hole.

5. A locator assembly as described in claim 3 wherein both of said front end module and said body structures have at least one retaining clip and one retention hole receiving one of said retaining clips.

* * * * *